United States Patent

[11] 3,624,067

[72] Inventors Max A. Weaver;
James M. Straley, both of Kingsport, Tenn.
[21] Appl. No. 5,936
[22] Filed Jan. 26, 1970
[45] Patented Nov. 30, 1971
[73] Assignee Eastman Kodak Company
Rochester, N.Y.
Continuation-in-part of application Ser. No. 683,112, Nov. 15, 1967, Continuation-in-part of application Ser. No. 686,834, Nov. 30, 1967. This application Jan. 26, 1970, Ser. No. 5,936

[54] DISAZOCOMPOUNDS CONTAINING A DICARBOXIMIDO, PYRROLIDINONO, PIPERIDONO, OR PHTHALIMIDINO GROUP
9 Claims, No Drawings

[52] U.S. Cl. .................................................. 260/152,
260/156, 260/281, 260/294.7 F, 260/325, 260/326
[51] Int. Cl. ........................................................ C09b 31/06,
C09b 31/14, D06p 1/08
[50] Field of Search ........................................... 260/152,
157, 158, 156

[56] References Cited
UNITED STATES PATENTS
3,133,052 5/1964 Merian et al. .................. 260/152 X Primary Examiner—Floyd D. Higel
Attorneys—J. Frederick Thomsen and Cecil D. Quillen, Jr.

ABSTRACT: Disazocompounds containing a dicarboximido, pyrrolidinono, piperidono or phthalimidino group bonded to a nuclear carbon atom of a benzene diazocomponent and having a phenolic coupling component are useful as dyes for hydrophobic textile materials such as polyester fibers on which the compounds give yellow to orange dyeings which exhibit superior fastness to light and sublimation.

DISAZOCOMPOUNDS CONTAINING A DICARBOXIMIDO, PYRROLIDINONO, PIPERIDONO, OR PHTHALIMIDINO GROUP

This application is a continuation-in-part of our Defensively Published (849 O.G. 1221) U.S. Pat. applications Ser. Nos. 683,112, filed Nov. 15, 1967 for "Disazo Compounds Containing a Dicarboximido Group," and 686,834, filed Nov. 30, 1967 for "Disazo Compounds."

This invention relates to certain novel, water-insoluble, disazocompounds and, more particularly, to disazocompounds containing a dicarboximido, a pyrrolidinono, a piperidono or a phthalimidino radical attached to a nuclear carbon atom of a benzene diazocomponent, and to the use of such compounds as dyes for hydrophobic fibers.

The disazocompounds of the invention have the formula

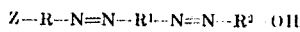

Z—R—N=N—R¹—N=N—R² OH wherein

Z represents a dicarboximido radical, pyrrolidinono, lower alkylpyrrolidinono, piperidono, lower alkylpiperidono, phthalimidino, or lower alkylphthalimidino;

R represents phenylene or phenylene substituted with lower alkyl, lower alkoxy, lower hydroxyalkyl, halogen, lower alkanoylamino, lower alkylsulfonamido, phenoxy, or lower alkylsulfonyl; and R¹ and R² are the same or different and each represents p-phenylene or p-phenylene substituted with lower alkyl, lower hydroxyalkyl, lower alkoxy, halogen, lower alkylthio, lower alkanoylamino, lower alkylsulfonamido, or phenoxy.

The disazocompounds of the invention give fast yellow to orange shades on hydrophobic textile materials such as cellulose acetate, polyamide, and, particularly, polyester fibers. The novel disazocompounds exhibit superior fastness to light and sublimation when compared to disazocompounds in which a group similar to Z, as defined above, is attached to the nitrogen atom of an aniline coupling component through an alkyl group.

The dicarboximido radical which Z can represent can be unsubstituted or substituted, for example, with lower alkyl, lower alkoxy, halogen, mercapto, alkylcarbamoyloxy, lower alkylthio, phenylcarbamoyloxy, lower alkanoyloxy, nitro, amino, lower alkanoylamino, lower alkylsulfonamido, etc. Specific examples of the dicarboximido radicals represented by Z are described in detail in U.S. Pat. Nos. 3,148,178, 3,148,180, 3,161,631, and 3,386,987. Examples of the groups represented by Z—R— include 4-succinimidophenyl, 3-chloro-4-succinimidophenyl, 2-methyl-4-citraconimidophenyl, 3-alkoxy-4-(3-methylsuccinimido)phenyl, 4-acetamido-3-(3,4-dihydroxysuccinimido)-phenyl, 3-glutarimidophenyl, 3-bromo-4-(4-acetoxyglutarimido)-phenyl, 4-maleimidophenyl, 2-methylsulfonyl-43-(cyclohexane-1,2-dicarboximido)phenyl, 4-pyrrolidinonophenyl, 3-pyrrolidinonophenyl, 2-methyl-4-pyrrolidinonophenyl, 3-chloro-4-(3-methyl-pyrrolidinono)phenyl, 4-piperidonophenyl, 3-ethoxy-5-piperidonophenyl, 2-methylsulfonyl-4-(6-methyl-piperidono)phenyl, 2-acetamido-4-piperidonophenyl, 4-phthalimidinophenyl, 3-methylsulfonamido-5-phthalimidinophenyl.

A preferred group of the dicarboximido radicals represented by Z have the formula

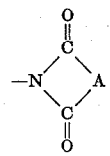

wherein

A represents alkylene of two or three carbon atoms; alkylene of two or three carbon atoms substituted with lower alkyl, lower alkoxy, halogen, hydroxy, mercapto, lower alkylthio, lower alkanoyloxy, lower alkanoyl, amino, lower alkanoylamino, carbamoyl, phenylcarbamoyloxy, or lower alkylcarbamoyloxy; alkenylene of two or three carbon atoms; alkenylene of two or three carbon atoms substituted with lower alkyl; bicyclo[2.2.1]5-heptene-2,3-diyl; ortho-phenylene; ortho-phenylene substituted with lower alkyl, lower alkoxy, halogen, or amino; or 1,2-cyclohexylene. Specific examples of the groups represented by A include ethylene, propylene, vinylene, methylvinylene, 1,2-butylene, methoxyethylene, 1,2-dichloroethylene, 3-bromopropylene, mercaptoethylene, methylthioethylene, 3-acetoxypropylene, propionylethylene, aminoethylene, acetamidopropylene, carbamoylethylene, 4-ethyl o phenylene, 4-methoxy-o-phenylene, 3,4,5,6-tetrachloro o-phenylene, etc.

Further illustrations of the groups which can be present on the phenylene group represented by R are ethyl, propyl, isopropyl, butyl, ethoxy, propoxy, butoxy, bromo, 2-hydroxyethyl, 3-hydroxypropyl, propionamido, butyramido, ethylsulfonamido, propylsulfonamido, ethylsulfonyl, butylsulfonyl, methylthio, butylthio, etc. The above lower alkyl, lower alkoxy, lower hydroxyalkyl, halogen, lower alkanoylamino, lower alkylsulfonamido, lower alkylthio groups are also representative of the substituents which can be present on the p-phenylene radicals represented by R¹ and R². As used herein, "lower" designates an alkyl moiety having one to about four carbon atoms.

Particularly fast dyeings on polyester fibers are obtained by the use of the novel disazocompounds having the formula

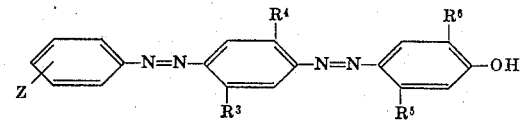

wherein

Z is succinimido, phthalimido, pyrrolidinono, piperidono, or phthalimidino attached to the phenyl ring at the 3 or 4 position;

R³ and R⁵ are the same or different and each is hydrogen, lower alkyl, lower alkoxy, halogen, or lower alkanoylamino; and R⁴ R⁶ are the same or different and each is hydrogen, lower alkyl, lower alkoxy, or halogen.

The novel compounds of the invention are prepared by diazotizing an amine having the formula

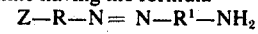

Z—R—N=N—R¹—NH₂ and coupling the resulting diazonium salt with a phenol having the formula H—R²—OH wherein Z, R, R¹ and R² are defined above. The amines useful in preparing the novel disazocompounds are prepared similarly by diazotizing and aniline compound having the formula Z—R—NH₂ and coupling the diazonium salt to an aniline coupling component having the formula H—R¹—NH₂. The above-mentioned amines and phenols are commercially available compounds and/or can be prepared by published techniques.

The following examples further illustrate the preparation of the intermediates and the novel disazocompounds of the invention.

PREPARATION OF INTERMEDIATE AMINES

Example 1

*Preparation of N-(4-aminophenyl)succinimide*—100 g. succinic anhydride, 138 g. p-nitroaniline, and 1 cc. conc. sulfuric acid are heated together with manual mixing to 155° C. At this temperature evolution of water begins and the mixture becomes fluid. After about 30 minutes, 10 g. additional succinic anhydride is added to replace any lost by sublimation.

After about 30 minutes longer, there is no evidence of liquid or reaction, and the temperature is 185° C. After allowing to cool, the product is ground in a mortar and slurried in 200 cc. methanol. This mixture is stirred 30 minutes, filtered, and the product washed with methanol. Yield—217 g. (98.6 percent) m.p. 204°–205° C. 100 g. N-(p-Nitrophenyl)succinimide is hydrogenated over 5 g. Raney nickel in 1,000 ml. 2-β-alcohol at 100° C. in stainless steel autoclave. Most of the ethanol is removed from the reaction mixture and the residue heated to boiling in 800 ml. glacial acetic acid. This boiling mixture is filtered hot through a heated funnel to remove the Raney nickel. The filtrate is allowed to cool and the product collected by filtration, washed with ethanol, and dried at 60° C. Yield—43.5 g., m.p. 235°–236° C.

Example 2

*Preparation of N-(4-aminophenyl)-1,2,3,6-tetrahydrophthalimide*——76.0 g. cis-Δc-tetrahydrophthalic anhydride, 69 g. p-nitroaniline, 1 cc. conc. $H_2SO_4$ are heated together to 150° C. in a beaker. After about 30 minutes at this temperature, the evolution of water slows down. The temperature is gradually increased to 190° C. and held for 30 minutes longer. The product is poured into an evaporating dish and allowed to solidify. It is then ground in a mortar, slurried in water, filtered, washed well with water, and dried. Yield—130 g., m.p. 118°–128° C. This total amount is dissolved in 1,150 ml. n-amyl alcohol at the boil and filtered hot. The filtrate is allowed to stand at room temperature until crystallization is complete. The product is collected by filtration and dried at 65° C. Yield—94.0 g., m.p. 129°–130° C. Reduction of this compound as described above gives the corresponding amino compound.

Example 3

*Preparation of N-(m-aminophenyl)succinimide*—50.0 g. succinic anhydride, 69.0 g. m-nitroaniline, 3 drops conc. $H_2SO_4$ are mixed well and heated in a beaker. A slightly exothermic reaction begins at about 100° C. After heat is no longer evolved, the reaction mixture is heated at 165°–170° C. for 1 hr. The hot melt is then poured gradually into 400 ml. of hot 2-methoxyethanol with stirring and heated to boiling to dissolve all of the product. After allowing to cool, the crystalline product is collected by filtration, washed with a little ethanol, and air dried. Yield—94.0 g., m.p. 171°–173° C. 94.0 g. N-(m-Nitrophenyl)succinimide is hydrogenated over 5 g. Raney nickel at 100° C. in 1 liter of 2-methoxyethanol. The reaction mixture from the autoclave is heated to boiling and filtered through a heated funnel to remove the Raney nickel. The cooled filtrate is filtered and the product washed with ethanol and dried in air. Yield—58.0 g., m.p. 191°–193° C.

Example 4

*Preparation of N-(4-amino-2-chloro)succinimide*—68.6 g. 2-chloro-4-nitroaniline, 50.0 g. succinic anhydride, 3 drops conc. $H_2SO_4$ are heated and stirred together at 190°–195° C. for 1 hr. The hot reaction mixture is poured gradually into 500 ml. 2-β-alcohol with stirring. All of the product dissolves. On cooling to room temperature the product crystallizes and is collected by filtration, washed with a little ethanol, and air dried. Yield—81.0 g., m.p. 155°–157° C. 81.0 g. N-(2-Chloro-4-nitrophenyl)succinimide is hydrogenated in 600 ml. of 2-methoxyethanol at 100° C. over 3 g. Raney nickel and the product isolated as in example 3. Yield—47.3 g., m.p. 221°–223°C.

The intermediates having the formula Z—R—$NH_2$ wherein Z is a dicarboximido radical can also be prepared by other techniques such as by reacting an aniline compound with a dicarboxylic anhydride to produce the corresponding N-phenyldicarboximide followed by nitration and reduction to the amine. Examples of other dicarboxylic acids and anhydrides useful in preparing the dicarboximidoaniline compounds include hexahydrophthalic acid, pyrotartaric anhydride, phthalic anhydride, malic acid, chlorosuccinic acid, mercaptosuccinic acid, glutaric anhydride, 3- and 4-chlorophthalic anhydride, tetrachlorophthalic anhydride, 3- and 4-nitrophthalic anhydride, bicyclo[2.2.1]5-heptene-2,3-dicarboxylic anhydride, α-methylglutaric anhydride, and maleic anhydride.

Example 5

*Preparation of N-[4-(4-Amino-2-tolylazo)phenyl]succinimide*——23.7 g. N-(p-aminophenyl)succinimide is slurried in 250 ml. water and 37.5 ml. conc. HCL added. After cooling to about 0° C. with ice bath, a solution of 9.6 g. $NaNO_2$ in 25 ml. water is added below 5° C. The diazotization reaction is stirred 1 hr. at 0°–5° C. and the excess nitrous acid destroyed with aqueous urea. This reaction mixture is then added to a solution of 13.4 g. of m-toluidine in 125 ml. water plus 15 ml. conc. HCl, all in the presence of crushed ice for cooling. After neutralizing with ammonium acetate, the reaction mixture is allowed to stand 3 hr. and then diluted further with water. The product is collected by filtration, washed with water, and air dried. Recrystallization from 500 ml. of 2-methoxyethanol gives 15.6 g. of product melting at 252°–253° C.

Example 6

*Preparation of N-[4-(4-amino-2-methoxyphenylazo)phenyl] succinimide*—23.7 g. N-(p-aminophenyl)succinimide is diazotized and coupled with 15.4 g. m-anisidine exactly as described in example 5. The produce is recrystallized from 600 ml. of 2-methoxyethanol, filtered, and washed with ethanol. Yield—29.6 g., m.p. 255°–257° C.

Example 7

*Preparation of N-[4-(4-amino-2,5-dimethoxyphenylazo)phenyl]succinimide*—23.7 g. N-(p-aminophenyl)succinimide is diazotized and coupled with 15.6 g. 2,5-dimethoxyaniline as described in example 5. The product is collected by filtration, washed with water, and air dried. Recrystallization from 100 ml. of 2-methoxyethanol gives 28.8 g. of product, melting at 197°–198° C.

Example 8

*Preparation of N-[4-(4-amino-2-chlorophenylazo)2-chlorophenyl]-succinimide*—28.1 g. N-(4-amino-2-chlorophenyl) succinimide (example 4) is diazotized using $NaNO_2$ and aqueous HCl, and coupled with 16.0 g. m-chloroaniline as illustrated in the preceding examples to yield the desired product.

Example 9

*Preparation of N-[4-(4-amino-o-tolylazo)phenyl]2-pyrrolidinone* —22.0 g. N-(p-aminophenyl)-2-pyrrolidinone is stirred in 250 ml. water and 37.5 ml. conc. HCl added. The solution is cooled to 0° C. and a solution of 9.6 g. $NaNO_2$ in 25 ml. water was added at 0°–5° C. The reaction is stirred for 1 hr. at this temperature and the excess nitrous acid destroyed with aqueous urea. This diazonium solution is added to 13.4 g. m-toluidine dissolved in dilute HCl (250 ml. water; 15.0 ml. conc. HCl), all in the presence of crushed ice for cooling. Solid ammonium acetate is then added until a test sample turned Congo Red paper brown. After allowing to couple for 2½ hr. the product is drowned further with water, filtered, washed with water, and air dried. This material is recrystallized from ethanol. Yield—16.0 g., m.p. 200°—203° C.

Analysis - Theory % C—69.4, % H—6.2, % N—19.0;
Found % C—69.2, % H—6.3, % N—19.1

Example 10

*Preparation of N-[4-(4-amino-2-chlorophenylazo)phenyl]-2-pyrrolidinone* —22.0 g. N-(p-aminophenyl)-2-pyrrolidinone is diazotized as in example 9 and coupled with 15.9 g. m-chloroaniline dissolved in 250 ml. water plus 15 ml. conc. HCl in the presence of ice as in the above example. The product is isolated by filtering and is washed with water. The air dried material is recrystallized from ethanol. Yield—16.6 g., m.p. 150°–152° C.

Analysis: Theory—% C—61.0, % H—4.8, % N—17.8;
Found—% C—61.1, % H—4.6, % N—17.8

Example 11

*Preparation of N-[4-(4-amino-2,5-dimethoxyphenylazo)phenyl]-2-phthalimidine* —2.24 g. 2-(p-aminophenyl)phthalimidine is slurried in 10 ml. water and 3 ml. conc. HCl. Very little material dissolves. The mixture is cooled to 0° C. and a solution of 0.72 g. NaNO₂ in 2 ml. water is added at 0°–5° C. After stirring 1 hr. at 0°–5° C. the excess nitrous acid is destroyed by the addition of aqueous area. The diazonium mixture is then added to a solution of 1.52 g. 2,5-dimethoxyaniline in dilute HCl (50 ml. water and 5 ml. conc. HCl), all in the presence of crushed ice. After neutralizing with ammonium acetate, the reaction mixture is diluted further with water and allowed to stand 3 hr. with occasional stirring. The product is collected by filtration, washed with water, and air dried.

Example 12

*Preparation of N-[4-(4-amino-2,5-dimethoxyphenylazo)phenyl]-2-piperidone* —1.90 g. 2-(N-(p-aminophenyl)piperidone (prepared by the reaction of aniline with delta-valerolactone, followed by nitration and reduction) is diazotized and coupled with 1.52 g. 2,5-dimethoxyaniline as described in example 11. The product is isolated by filtering, and is washed with water and air dried.

PREPARATION OF THE DISAZOCOMPOUNDS

Example 13

0.74 g. sodium nitrite is added portionwise to 5 ml. conc. H₂SO₄. The nitrosyl sulfuric acid is cooled and 10 ml. 1:5 acid (1 part propionic:5 parts acetic acid) is added below 10° C. Then 3.08 g. N-[4-(4-amino-2-tolylazo)phenyl]succinimide (example 5) is added, followed by 10 ml. 1:5 acid, all at 0°–5° C. The reaction is stirred at 0°–5° C. for 3 hr. and then added to a solution of 1.08 g. of m-cresol in 100 ml. water containing 4 g. NaOH, plus crushed ice for cooling. After coupling for 2 hr., the dye is collected by filtration, washed with water, and air dried. It dyes polyester fibers reddish-yellow shades having excellent light and sublimation fastness. The dye has the structure:

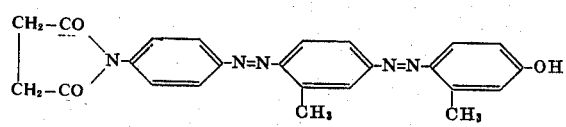

Example 14

3.08 g. N-[4-(4-Amino-2-tolylazo)phenyl]succinimide is diazotized and coupled with 1.08 g. of o-cresol as described in example 13. The product is isolated in a similar manner and has the following structure:

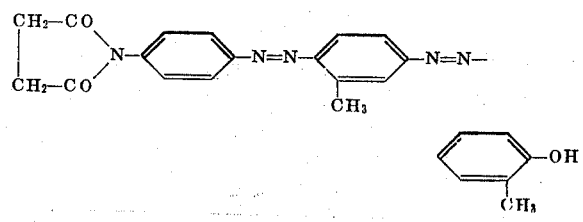

It dyes polyester fibers reddish-yellow shades possessing excellent light and sublimation fastness.

Example 15

3.08 g. N-[4-(4-Amino-o-tolylazo)phenyl]succinimide is diazotized and coupled with 1.86 g. of m-phenoxyphenol as described in example 13. The product dyes polyester fibers an orange shade and has excellent light and sublimation fastness. It has the following structure:

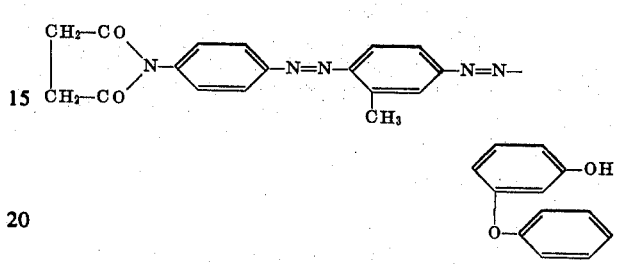

Example 16

0.72. sodium nitrite is added portionwise to 5 ml. conc. H₂SO₄. The nitrosyl sulfuric acid is cooled and 10 ml. 1:5 acid added below 10° C. Then 3.22 g. of N-[4-(4-amino-2,5-dimethylphenylzao)phenyl]succinimide is added, followed by 10 ml. of additional 1:5 acid, all at 0°–5° C. After stirring about 30 minutes at 0°–5° C. much of the material appears to be insoluble. The reaction mixture is kept below 5° C. and 20 ml. of water added portionwise. The diazotization is stirred a total of 2 hr. at 0°–5° C. and then added to a solution of 1.22 g. of 2,5-dimethylphenol in 100 ml. water, containing 4 g. NaOH, all in the presence of crushed ice for cooling. After allowing to couple 3 hr., the reaction mixture is diluted further with water and filtered. The product is washed with water and dried in air. When dyed on polyester fibers the dye has excellent light and sublimation fastness and produces deep yellow shades. It has the structure.

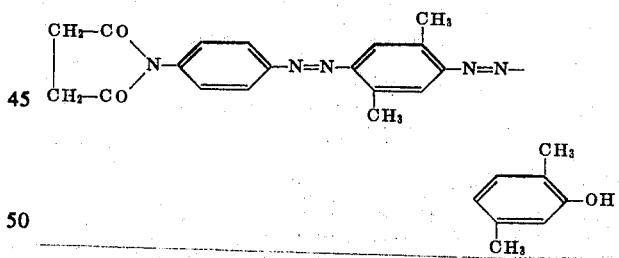

Example 17

3.22 g. N-[4-(4-Amino-2,5-dimethylphenylazo)phenyl]succinimide is diazotized and coupled with 1.24 g. m-methoxyphenol as illustrated in example 16 to yield a dye of the following structure:

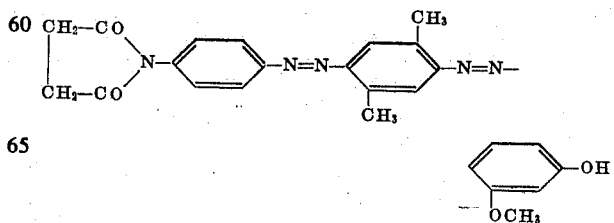

It possesses excellent fastness to light and sublimation when dyed on polyester fibers.

Example 18

0.72 g. dry NaNo₂ is added portionwise to 5 ml. conc. H₂SO₄. The pale yellow solution is cooled and 10 ml. 1:5 acid (1 part propionic:5 parts acetic acid) is added at less than 10° C. The mixture is cooled to about 0° C. and 2.94 g. N-[4-(4-amino-o-tolylazo)phenyl]2-pyrrolidinone (example 1 ) is added, followed by 10 ml. 1:5 acid, all below 5° C. After stirring at 0°–5° C. for 2½ hr., the diazonium solution is added to 1.08 g. m-cresol in 100 ml. water containing 4 g. NaOH, plus crushed ice for cooling. The reaction mixture is allowed to stand for 2 hr. at about 10° C. to complete coupling. The product is collected by filtration, washed with water, and air dried. This dye colors polyester fibers reddish-yellow shades having excellent light and sublimation fastness. It has this structure.

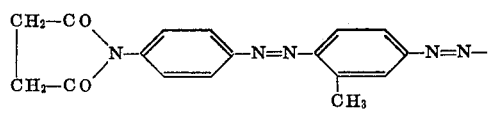

Example 19

2.94 g. N-[4-(4-amino-o-tolylazo)phenyl]2-pyrrolidinone is diazotized and then coupled with 0.94 g. phenol, as described in example 18 to give the following yellow dye:

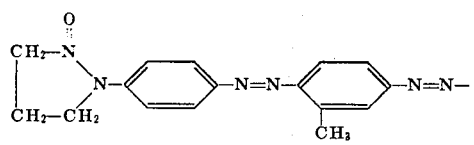

This dye has outstanding light and sublimation fastness when dyed on polyester fibers.

Example 20

2.94 g. N-[4(4-amino-o-tolylazo)phenyl]2-pyrrolidinone is diazotized and coupled with 1.86 g. m-phenoxyphenol, as illustrated in example 18 to give the following yellow dye:

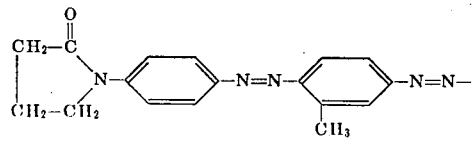

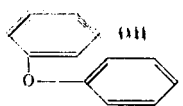

This dye produces deep reddish-yellow shades when dyed on polyester fibers and has good light and sublimation fastness.

Example 21

0.72 g. NaNO$_2$ is added portionwise to 5 ml. conc. H$_2$SO$_4$. The solution is cooled and 10 ml. 1:5 acid is added below 15° C. After cooling to about 0° C., 3.40 g. N-[4-(4-amino-2,5-dimethoxyphenylazo)phenyl]g2-pyrrolidinone is added, followed by 10 ml. 1:5 acid, all at below 5° C. The reaction is stirred at 0°–5° C. for 2½ hours and then added to a solution of 0.94 g. phenol in 100 ml. water plus 4 g. NaOH, plus crushed ice for cooling. After allowing to couple 2½ hours, the product is collected by filtration, washed with water, and air dried. The product dyes polyester fibers orange shades with excellent light and sublimation fastness. It has the structure:

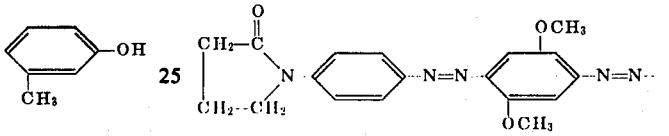

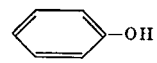

Example 22

2.94 g. N-[3-(4-amino-o-tolylazo)phenyl]2-pyrrolidinone is diazotized and coupled with 1.08 g. m-cresol as described in example 18 to give a yellow dye of similar properties. It has the following structure:

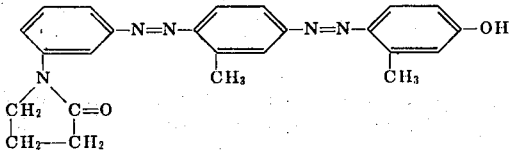

The disazocompounds described in the examples of the following table are prepared according to the procedures set forth in examples 13 through 22. The compounds of the table, which conform to the formula

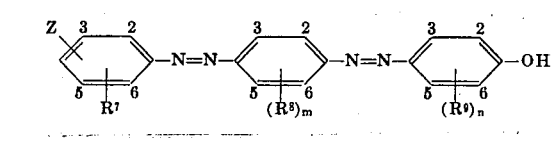

wherein $m$ and $n$ can be 1 or 2, give yellow to orange dyeings exhibiting excellent fastness properties on polyester fibers.

TABLE

| Example number | Z | R⁷ | (R⁸)m | (R⁹)n |
|---|---|---|---|---|
| 23 | 4-succinimido | Hydrogen | 3-methyl | 3-chloro. |
| 24 | do | 2-methyl | do | 3-methyl. |
| 25 | do | 2-chloro | 2-methyl | Do. |
| 26 | do | 3-methyl | 3-methyl | 2,5-dimethyl. |
| 27 | do | Hydrogen | do | Do. |
| 28 | do | do | 2-methoxy-5-acetamido | 3-methyl. |
| 29 | do | do | 2,5-dimethoxy | Do. |
| 30 | do | 2-chloro | 3-chloro | Do. |
| 31 | do | 2-methylsulfonyl | 3-methyl | Do. |
| 32 | 3-succinimido | Hydrogen | do | Do. |
| 33 | do | do | 2,5-dimethyl | Do. |
| 34 | do | 5-acetamido | do | 3-phenoxy. |
| 35 | do | Hydrogen | 3-methyl | 3-methoxy. |
| 36 | do | do | 2,5-dimethoxy | 3-methyl. |
| 37 | do | 5-methoxy | 3-methylsulfonamido | 3-methylthio. |
| 38 | 4-phthalimido | Hydrogen | 2,5-dimethoxy | 3-methyl. |
| 39 | do | 2-methyl | 3-methyl | Do. |
| 40 | do | do | Hydrogen | Do. |
| 41 | do | Hydrogen | 3-hydroxymethyl | Do. |
| 42 | 4-hexahydrophthalimido | do | 3-methyl | Do. |
| 43 | 3-(4-chlorophthalimido) | do | do | Do. |
| 44 | 4-(4-aminophthalimido) | do | do | Do. |
| 45 | 4-(3-hydroxysuccinimido) | 2-methoxy | do | Do. |
| 46 | do | Hydrogen | 2,5-dimethoxy | Do. |
| 47 | 3-(3-chlorosuccinimido) | do | 3-methyl | Do. |
| 48 | 2-glutarimido | do | do | Do. |
| 49 | do | do | 2,5-dimethyl | Do. |
| 50 | 4-(3-methylsuccinimido) | do | do | Do. |
| 51 | 4-maleimido | do | do | Do. |
| 52 | 4-citraconimido | 4-bromo | 3-acetamido | 3-methylsulfonamido. |
| 53 | 4-(3-acetoxysuccinimido) | 2-methylsulfonyl | 3-methyl | 2,5-dimethoxy. |
| 54 | 3-(3-phenylcarbamoyloxy succinimido) | Hydrogen | Hydrogen | Hydrogen. |
| 55 | 3-(4-hydroxyglutarimido) | 5-methyl | 2-methyl | 2-methyl. |
| 56 | 4-(4-acetamidoglutarimido) | Hydrogen | 3-methyl | 3-methyl. |
| 57 | 4-(2-pyrrolidinono) | do | do | 3-methoxy. |
| 58 | do | do | do | 2,5-dimethyl. |
| 59 | do | do | do | 3-chloro. |
| 60 | do | do | do | 3-acetamido. |
| 61 | do | do | 5-acetamido-2-methoxy | 3-methyl. |
| 62 | do | do | Hydrogen | Hydrogen. |
| 63 | do | 2-methyl | do | Do. |
| 64 | do | do | 3-methyl | 3-methyl. |
| 65 | do | do | 2,5-dimethyl | Do. |
| 66 | do | 3-chloro | 3-methyl | Do. |
| 67 | do | do | 3-chloro | Do. |
| 68 | do | Hydrogen | 3-methyl | 2-methyl. |
| 69 | do | do | do | 2,5-dimethyl. |
| 70 | 4-(5-methyl-2-pyrrolidinono) | do | do | 3-bromo. |
| 71 | do | do | 2,5-dimethoxy | 3-methyl. |
| 72 | 3-(2-pyrrolidinono) | do | do | Do. |
| 73 | do | do | 2-methyl-5-methoxy | 3-phenoxy. |
| 74 | 4-(2-piperidono) | do | 3-methyl | Hydrogen. |
| 75 | do | do | 3-methoxy | 3-methyl. |
| 76 | do | do | 3-chloro | Do. |
| 77 | 4-(2-phthalimidino) | do | do | Do. |
| 78 | do | do | 3-methyl | Do. |
| 79 | do | 2-methyl | do | Do. |
| 80 | do | 2-methoxy | do | Do. |
| 81 | 3-(2-phthalimidino) | 5-acetamido | do | 3-methylthio. |
| 82 | do | 5-methylsulfonyl | 3-bromo | 3-acetamido. |
| 83 | 2-(2-pyrrolidinono) | 4-methylsulfonamido | 2,5-dichloro | 3-methyl. |
| 84 | do | Hydrogen | 3-methyl | Do. |
| 85 | do | do | 2,5-dimethyl | Do. |
| 86 | 4-(2-pyrrolidinono) | do | 3-hydroxymethyl | Hydrogen. |
| 87 | do | do | do | Do. |
| 88 | do | do | 3-methylsulfonamido | 3-methyl. |

The disazocompounds of the invention can be used for dyeing hydrophobic fibers such as linear polyester, cellulose ester, acrylic, polyamide, etc., fibers in the manner described in U.S. Pats. NOs. 2,880,050, 2,757,064, 2,782,187 and 3,043,827. The following examples illustrate one method by which the compounds of the invention can be applied to polyester textile materials.

Example 87

The dye of example 13 (0.1 g.) is dissolved in the dye pot by warming in 5 cc. of 2-methoxyethanol A 2 -percent sodium-N-methyl-n-oleoyl taurate and 0.5 -percent sodium lignin sulfonate aqueous solution (3–5 cc.) is added, with stirring, until a fine emulsion is obtained. Water is then slowly added to a total volume of 200 cc. Then, 3 cc. of Tanavol (a solvent carrier) are added and 10 g. of a textile fabric made of polyfibers (ethylene terephthalate are entered. The fabric is worked 10 minutes without heat and then for 10 minutes at 80° C. The dyebath is then brought to the boil and held at the boil for 1 hour. Following this, the fabric is rinsed in warm water, then scoured in aqueous 0.2 -percent soap, 0.2 -percent soda ash solution. After scouring, the fabric is rinsed with warm water and dried.

When the compounds of the invention are used to dye polyamide textile materials, the above procedure can be employed except the Tanavol dyeing assistance need not be used. When cellulose acetate fibers are dyed with the compounds, the above procedure can be followed omitting the Tanavol dyeing assistant and carrying out the dyeing at 80° C. for 1 hour rather than at the boil.

The compounds of the invention can also be applied to polyester textile materials by the heat fixation technique of dyeing. This procedure is described in U.S. Pat. No. 2,663,612 and in the American Dyestuff Reporter, 42, 1 (1953).

Polymeric linear polyester materials of the terephthalate type are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. Nos. 2,901,446. Poly(ethylene terephthalate) polyester fibers are described, for example, in U.S. Pat. No. 2,465,319. The polymeric linear polyester materials disclosed in U.S Pats. Nos. 2,945,010, 2,957,745, and 2,989,363, for example, can be dyed. The linear aromatic polyester materials specifically named have a melting point of at least 200° C.

Examples of the polyamide fibers that can be dyed with the compounds of the invention are those consisting of nylon 66, made by the polymerization of adipic acid and hexamethylenediamine, nylon 6, prepared from epsilon-aminocaproic acid lactum and nylon 8. The cellulose acetate fibers that can be dyed with the compounds of the invention including fibers consisting of either cellulose triacetate or partially hydrolyzed cellulose acetate.

This invention has been described in detail with particular reference to preferred embodiments thereof, but it will be understood that variations and modifications can be effected within the spirit and scope of the invention as described hereinabove.

We Claim:

1. A compound having the formula $$Z—R—N=N—R^1—N=N—R^2—OH$$

wherein Z is pyrrolidinono, lower alkylpyrrolidinono, piperidono, lower alkylpiperidono, phthalimidino, lower alkylphthalimidino, or a dicarboximido radical having a formula wherein A is alkylene of two or three carbon atoms; alkylene of two or three carbon atoms substituted with lower alkyl, lower alkoxy, chlorine, bromine, hydroxy, mercapto, lower alkylthio, lower alkanoyloxy, lower alkanoyl, amino, lower alkanoylamino, carbamoyl, phenylcarbamoyloxy, or lower alkylcarbamoyloxy; alkenylene of two or three carbon atoms; alkenylene of two or three carbon atoms; substituted with lower alkyl; bicyclo5-heptene-2,3-diyl; orthophenylene; orthophenylene substituted with lower alkyl, lower alkoxy, chlorine, bromine or amino; or 1,2-cyclohexylene;

R is phenylene or phenylene substituted with lower alkyl, lower alkoxy, chlorine, bromine, lower hydroxyalkyl, lower alkanoylamino, lower alkylsulfonamido, phenoxy, or lower alkylsulfonyl; and $R^1$ and $R^2$ are the same or different and each represents p-phenylene or p-phenylene substituted with lower alkyl, lower alkoxy, chlorine, bromine, lower alkylthio, lower alkanoylamino, lower alkylsulfonamido, or phenoxy.

2. A compound according to claim 1 wherein

Z is succinimido, glutarimido, maleimido, phthalimido, or hexahydrophthalimido;

R is phenylene or phenylene substituted with lower alkyl, lower hydroxyalkyl, lower alkoxy, chlorine, or bromine; and $R^1$ and $R^2$ are the same or different and each represents p-phenylene or p-phenylene substituted with lower alkyl, lower alkoxy, chlorine, bromine or lower alkanoylamido.

3. A compound according to claim 1 having the formula wherein

Z is succinimido, phthalimido, pyrrolidinono, piperidono or phthalimidino attached to the phenyl ring at the 3 or 4 position;

$R^3$ $R^5$ are the same or different and each represents hydrogen, lower alkyl, lower alkoxy, chlorine, bromine or lower alkanoylamino; and $R^4$ $R^6$ are the same or different and each represents hydrogen, lower alkyl, lower alkoxy, chlorine or bromine.

4. A compound according to claim 1 having the formula

5. A compound according to claim 1 having the formula

6. A compound according to claim 1 having the formula

7. A compound according to claim 1 having the formula

8. A compound according to claim 1 having the formula

9. A compound according to claim 1 having the formula